United States Patent
Huybrechts et al.

(10) Patent No.: US 6,239,214 B1
(45) Date of Patent: May 29, 2001

(54) GRAFT COPOLYMER EMULSIONS AND TWO-PACKAGE WATERBORNE URETHANE COATINGS

(75) Inventors: Josef Huybrechts, Oud-Turnhout; Peter Paul Bruylants, Boortmeerbeek; Anne De Marre, Mechelen, all of (BE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/462,964

(22) PCT Filed: Jul. 14, 1998

(86) PCT No.: PCT/US98/14509

§ 371 Date: Jan. 14, 2000

§ 102(e) Date: Jan. 14, 2000

(87) PCT Pub. No.: WO99/03905

PCT Pub. Date: Jan. 28, 1999

Related U.S. Application Data
(60) Provisional application No. 60/052,560, filed on Jul. 16, 1997.

(51) Int. Cl.⁷ ............................... C08J 3/00; C08K 3/20; C08L 75/00; C08F 8/30
(52) U.S. Cl. .......................... 524/591; 524/507; 524/839; 524/840; 524/504; 525/123; 525/455
(58) Field of Search .................. 524/504, 507, 524/591, 839, 840; 525/123, 455

(56) References Cited

U.S. PATENT DOCUMENTS

| | | | |
|---|---|---|---|
| 4,440,897 | 4/1984 | Maska | 524/460 |
| 4,546,140 | 10/1985 | Shih | 524/394 |
| 4,730,021 | 3/1988 | Zom et al. | 524/457 |
| 5,015,688 | 5/1991 | Bederke et al. | 524/600 |
| 5,231,131 | 7/1993 | Chu et al. | 524/504 |
| 5,264,530 | 11/1993 | Darmon et al. | 526/194 |
| 5,266,361 | 11/1993 | Schwarte et al. | 427/407.1 |
| 5,290,633 | 3/1994 | Devlin et al. | 428/423.1 |
| 5,331,039 | * 7/1994 | Blum et al. | 524/507 |
| 5,336,711 | 8/1994 | Schneider et al. | 524/507 |
| 5,490,915 | 2/1996 | Bracher | 204/298.18 |
| 5,936,026 | 9/1999 | Huybrechts et al. | 524/504 |

FOREIGN PATENT DOCUMENTS

| | | |
|---|---|---|
| 3909756 | * 10/1989 | (DE) . |
| 0 365 098 | 10/1988 | (EP) . |
| 0 322 188 | 6/1989 | (EP) . |
| WO 89/02452 | 3/1989 | (WO) . |
| 95/32255 | * 11/1995 | (WO) . |

* cited by examiner

*Primary Examiner*—Patrick D. Niland
(74) *Attorney, Agent, or Firm*—James A. Costello; Sudhir G. Deshmukh

(57) ABSTRACT

The invention concerns a graft copolymer emulsion which is anionically stabilized and which contains an amino-functional monomer. The graft copolymer, useful in a coating composition, has a weight average molecular weight of at least about 3,000 and comprises 20 to 95 weight percent of a polymer backbone and 5 to 80 weight percent of a macromonomer. The polymer backbone further comprises 0.5 to 30 weight percent of an amino-functional monomer and the macromonomer comprises at least about 5 weight percent of an unsaturated acid-functional monomer.

8 Claims, No Drawings

GRAFT COPOLYMER EMULSIONS AND TWO-PACKAGE WATERBORNE URETHANE COATINGS

This application is a 371 of PCT/US98/14509, filed Jul. 14, 1998, which claims benefit of 60/052,560, filed Jul. 16, 1997.

BACKGROUND OF THE INVENTION

This invention relates to a graft copolymer emulsion and a waterborne polymer composition containing the graft copolymer emulsion, the emulsion comprising a polymer backbone and a macromonomer compound. This composition is stabilized anionically and contains 0.5 to 30 weight percent of an amine-functional monomer copolymerized in the backbone and/or the macromonomer. The copolymer emulsions of this invention can be cured with a polyisocyanate.

Coating compositions generally comprise a carrier liquid, a film-forming polymer and a curing (crosslinking) agent. For waterborne coatings, the carrier liquid is primarily water. The combination of the film-forming polymer and the crosslinking agent is commonly referred to as a binder. It is desirable that the binder have a low viscosity such that the binder is readily sprayable using automated spraying equipment and a high solids content such that an adequate paint film thickness is yielded with one to two cross-passes of a spray gun.

In a one-package system, the binder is contained within a single package, and curing is typically accomplished by baking the coating after application. In a two-package (2K) system, the binder is contained in two separate packages: a first package contains the film-forming polymer and a second package contains the curing agent. Shortly prior to application, the contents of the two packages are combined, and curing occurs through chemical crosslinking reactions. Once the two packages are combined, the crosslinking reaction is irreversible, and thus two-package systems have a relatively short pot life.

Film-forming polymers most commonly employed are linear addition-type copolymers containing functional groups such as hydroxyl groups, and these copolymers are cured by reaction with crosslinking agents. In two-package urethane technology, curing agents based on isocyanate functional polymers are used that, upon mixing with a hydroxy-functional copolymer, react to form a crosslinked network.

The most relevant art appears to be WO95/32229. This publication, however, does not disclose the particular graft copolymer emulsion (of this invention) or the coating composition (of this invention) characterized as they are by the combination of excellent dry-film build, Persoz hardness, and solvent-resistance described herein (see Table 11).

SUMMARY OF THE INVENTION

This invention relates to graft copolymer emulsions which are anionically stabilized by an acid functional macromonomer and in which either macromonomer and/or backbone contain an amine functional monomer, preferably t-butylamino ethyl methacrylate (TBAEMA). We have found that such macromonomers are able to stabilize an overall waterborne polymer composition which has amino functional groups.

This invention concerns a graft copolymer emulsion which is anionically stabilized and which contains an amine functional monomer. The graft copolymer has a weight average molecular weight of at least 3,000 and further comprises 20 to 95 weight percent of a polymer backbone of 5 to 80 weight percent of a macromonomer. Preferably, the graft copolymer comprises 60 to 95 weight percent of a polymer backbone and 5 to 40 weight percent of a macromonomer. The polymer backbone and/or macromonomer further comprises 0.5 to 30 weight percent of a secondary amino-functional monomer, preferably t-butylaminoethyl methacrylate. The macromonomer further comprises at least about 5 weight percent of an unsaturated acid-functional monomer, preferably methacrylic acid. The macromonomer is prepared using a cobalt-based catalytic chain transfer agent and has a weight average molecular weight of about 1,000 to 30,000.

The graft copolymer emulsion can be used in a waterborne coating composition of this invention which comprises 20 to 95 weight percent solids, based on binder solids, of a graft copolymer and 5 to 80 weight percent solids of a polyisocyanate curing agent and 0 to 75% of other film-forming polymers.

Preferred embodiments of this invention are the following.

A. A graft copolymer emulsion having a weight average molecular weight of at least 3.000 which is anionically stabilized and which comprises
  i) 20 to 95 weight percent of a polymer backbone of polymerized unsaturated compounds;
  ii) 5 to 80 weight percent of a macromonomer comprising at least about 5 weight percent of an unsaturated acid functional monomer, said macromonomer prepared using a cobalt-based catalytic chain transfer agent and said macromonomer having a weight average molecular weight of about 1,000 to 30,000;
so that the backbone comprises 0.5 to 30 weight percent of the total polymerizable unsaturated compounds of an amino-functional polymerizable component.

B. A waterborne coating composition comprising as binder components:
  a) 20 to 95 weight percent solids of graft copolymer emulsion A;
  b) 5 to 80 weight percent solids of a polyisocyanate curing agent; and
  c) 0 to 75 weight percent of other film-forming polymers.

C. The waterborne coating composition of B wherein said secondary amino functional monomer is t-butylaminoethyl methacrylate.

D. The waterborne coating composition of B wherein said catalytic chain transfer agent is selected from the group consisting of borondifluoro-stabilized chelates of a dialkyl- or diaryl-glyoxime of CoII or CoIII.

E. The waterborne coating composition of B wherein said graft copolymer comprises 60–95 weight percent of said polymer backbone and 5 to 40 weight percent of said macromonomer.

F. The waterborne coating composition of B wherein said polymer backbone comprises 5 to 50 weight percent of a vinyl aromatic. 10 to 70 weight percent of a compound selected from the group consisting of alkyl acrylate, cycloalkyl acrylate, and mixtures thereof, 5 to 40 weight percent of a compound selected from the group consisting of a hydroxy-functional polymerizable acrylate, hydroxy functional polymerizable methacrylate, and the mixtures thereof. 1 to 8 weight percent of a secondary amino functional monomer.

G. The waterborne coating composition of B wherein the said macromonomer comprises 10 to 90 weight percent of a compound selected from the group consisting of alkyl methacrylate, cycloalkyl methacrylate, and mixtures thereof, 0 to 40 weight percent of a hydroxy functional methacrylate, 0 to 20 weight percent of a secondary amino functional methacrylate, and 5 to 80 weight percent of an unsaturated acid functional monomer, wherein said macromonomer has a weight average molecular weight of 1,500 to 10,000.

H. The waterborne coating composition of B wherein said unsaturated acid functional monomer is methacrylic acid.

I. The waterborne coating composition of B wherein said graft copolymer is neutralized with an amine.

J. The waterborne coating composition of B further comprising an oligomeric methacrylate having a degree of polymerization for 2 to 10, wherein said oligomeric methacrylate is added in an amount to control the weight average molecular weight of the graft copolymer to about 3,000 to 80,000.

K. The waterborne coating composition of B wherein said polyisocyanate curing agent is selected from the group consisting of derivatives of hexamethylene diisocyanate, derivatives of isophorone diisocyanate, derivatives of m-xylylene diisocyanate, and mixtures thereof.

L. The waterborne coating composition of B further comprising 0–75 weight percent solids of a compound selected from the group consisting of auxiliary binder and crosslinker, additives, pigments, and extenders.

M. The waterborne coating composition of B wherein said polyisocyanate curing agent further comprises 0 to 75 weight percent hydrophobic polyisocyanate and about 25 to 100 weight percent hydrophilic polyisocyanate.

N. The waterborne coating composition of M wherein said hydrophobic polyisocyanate curing agent is selected from the group consisting of biurets or cyclotrimers of hexamethylene diisocyanate and/or isophorone diisocyanate.

O. The waterborne coating composition of M wherein said polyisocyanate curing agent is selected from polyisocyanates such as hexamethylene diisocyanate and isophorone diisocyanate modified with polyethyleneoxide to make the hydrophilic polyisocyanate water-dispersible.

P. The waterborne coating composition of L wherein the auxiliary binders and crosslinkers are selected from carbodiimide, epoxy derivatives, polyurethane and acrylic emulsions.

Other preferred embodiments comprise an (i) component having from 0.5 to 20 weight percent of a secondary amino-functional unsaturated monomer, e.g., tert-butyl amino ethyl methacrylate; the preferred crosslinking agent is a polyfunctional isocyanate having at least two isocyanate functionalities. The compositions of this invention are characterized by especially good drying performance.

DETAILS OF THE INVENTION

The graft copolymer is prepared by grafting macromonomers onto a polymer backbone. The macromonomers are prepared via free radical polymerization and comprise at least 5 percent of an unsaturated acid functional monomer. The macromonomers are neutralized with an amine and inverted into an anionic stabilized dispersion. Cobalt chain transfer agents are employed to yield macromonomers having a weight average molecular weight from about 1,000 to 30,000. The backbone monomers and/or macromonomers can comprise up to 30 percent of secondary amino-functional monomers.

Macromonomer Synthesis

The macromonomer contains a single terminal ethylenically unsaturated group which is polymerized into the backbone of the graft copolymer and primarily contains polymerized monomers. Preferably, the macromonomer is based on methacrylate or methacrylamide derivatives.

Examples of methacrylate monomers are alkylmethacrylates as methyl methacrylate, ethyl methacrylate, n-butyl methacrylate, i-butyl methacrylate, t-butyl methacrylate, 2-ethyl hexyl methacrylate, lauryl methacrylate, stearyl methacrylate. Other examples include cycloalkyl, aryl an aryl alkyl methacrylates as cyclohexyl methacrylate, isobornyl methacrylate, t-butyl cyclohexyl methacrylate, phenyl methacrylate, benzyl methacrylate and the like. Functional methacrylates are hydroxy functional methacrylates as 2-hydroxy ethyl methacrylate, 2- and 3-hydroxypropylmethacrylate, 4-hydroxybutyl methacrylate and the like. An example of an acid functional methacrylate and the preferred one is methacrylic acid. Examples of methacrylamide derivatives are methacrylamide, n-methylol methacrylamide, n-methoxy methyl methacrylamide, n-butoxy methyl methacrylamide and the like.

Other functional monomers can be copolymerized in the macromonomer compositions such as dimethyl aminoethylmethacrylate, diethylamino ethyl methacrylate, t-butyl amino ethyl methacrylate, methacryloxy ethyl phosphoric acid, sulfo ethyl methacrylate, methacryloxy ethyl, 2,2-spirocyclohexyl oxazolidine, nitrophenol methacrylate, ethyleneureaethyl methacrylate, methacrylonitrile, phtalimido methacrylate, polyethylene glycol methacrylate (varying in molecular weight), polypropyleneglycol methacrylate (varying in molecular weight), aceto acetoxy ethylmethacrylate, M-morpholinoethyl methacrylate, trimethoxy silyl propyl methacrylate.

Small amounts of polyfunctional methacrylates can be incorporated in the macromonomers such as ethyleneglycol dimethacrylate, 1,4-butane diol dimethacrylate, trimethylpropane trimethacrylate, and allylmethacrylate.

Reaction products of methacrylate monomers can be copolymerized. Examples include but are not limited to methacrylic acid reacted with epoxy derivatives such as cyclohexeneoxide, phenyl glycidyl ether, versatic acid epoxy esters such as Cardura® E10 and E5, 1,2-butylene oxide.

Other polymerizable methacrylate derivatives include reaction products of hydroxy alkyl methacrylate with ε-caprolactones and reaction products of glycidyl methacrylate with acids such as acetic acid, benzoic acid. At least 50 percent and preferably more than 70 percent can be methacrylate type monomers. Up to 40 percent of other polymerizable compounds can be copolymerized. Examples include acrylate monomers, acrylamide derivatives, vinyl monomers as vinyl aromatics and vinyl esters, maleic acid, fumaric acid, itaconic acid and its derivatives, acrylonitrile and acroleine.

In a first step, the macromonomer is prepared by polymerization of a monomer blend in an organic solvent or solvent blend (including a blend with water) using a free radical initiator and a cobalt chain transfer agent at an elevated temperature between 40° C. and 190° C. Typical solvents that can be used to form the macromonomer are ketones such as methylethyl ketone, isobutyl ketone, ethylamyl ketone, acetone, alcohols such as methanol, ethanol, isopropanol, esters such as ethyl acetate, glycols such as, ethyleneglycol monobutyl, ethers such as tetrahydrofuran, aromatic solvents as toluene, xylene and the like.

To insure the resulting macromonomer only has one terminal ethylenically unsaturated group which will polymerize with the backbone monomers to form the graft copolymer, the macromonomer is polymerized by using a catalytic chain transfer agent that contains a Co+2 or a Co3+ group. Preferred cobalt chain transfer agents are borondifluoro stabilized chelates of a dialkyl, borondifluoro stabilized chelates of a diarylglyoxime, and mixtures thereof. More specifically, preferred cobalt chain transfer agents are pentacyanocobaltate (II), diaquabis (borondifluoro dimethyl-glyoximato) cobaltate (II), and diaquabis borondifluorophenylglyoximato) cobaltate (II). Typically, cobalt chain transfer agents are used at concentrations of about 5 to 5,000 ppm depending upon the particular monomers used.

In subsequent steps, additional monomers and cobalt catalyst and conventional azo type polymerization initiators such as 2,2-azobis(2-methylbutane nitrile) and 2,2'-azobis (2,4'-dimethylpentane nitrile), 2,2'-azobis(2,4-dimethyl-4-methoxyvalero nitrile) are added and polymerization is continued until a macromonomer is formed of the desired molecular weight.

Any of the above mentioned azo-type catalysts can be used as can other suitable initiators such as peroxides, peroxyesters, peroxycarbonates and hydroperoxides. Typical of such catalysts are di-tetriarybutyl peroxide, di-cumyl peroxide. di-tertiaryamyl peroxide, cumene hydroperoxide, di-n-propyl peroxydicarbonate, peresters such as amyl peroxyacetate and the like.

Preferred alkyl methacrylates that can be used to produce the macromonomer have 1–18 carbon atoms in the alkyl group such as methyl methacrylate, ethyl methacrylate, propyl methacrylate, isopropyl methacrylate, butyl methacrylate, pentyl methacrylate, hexyl methacrylate, 2-ethylhexyl methacrylate, lauryl methacrylate and the like.

Other polymerizable nonmethacrylate based monomers that can be used in amounts less than 50 percent by weight are styrene, alpha-methyl styrene, methacrylamide and methacrylonitrile. Preferred hydroxy functional monomers that can be used are 2-hydroxyethyl methacrylate, 2- and 3-hydroxypropyl methacrylate, and the like. Preferred amino functional monomers are diethylaminoethyl methacrylate, t-butylaminoethyl methacrylate, methacryloxyethyl (2-2'spirocyclohexyl) oxazolidine.

The macromonomer can comprise 3 to 100 percent by weight, preferably about 20 to 50 percent by weight, based on the weight of the macromonomer, of an unsaturated acid functional monomer, i.e., a polymerized ethylenically unsaturated acid. Methacrylic acid is preferred particularly if it is the sole constituent. Other acids that can be used in less than 50 percent by weight are ethyleneically unsaturated carboxylic acids such as acrylic acid, itaconic acid, maleic acid and the like. Ethylenically unsaturated sulfonic, sulfinic, phosphoric or phosphonic acid and esters thereof also can be used such as styrene sulfonic acid, acrylamido methylpropane sulfonic acid, vinyl phosphonic acid and the like.

A preferred macromonomer comprises 10 to 90 weight percent of alkyl methacrylate, cycloalkyl methacrylate, or mixtures thereof, 0 to 40 weight percent of a hydroxy functional methacrylate, 0 to 20 weight percent of a secondary amino functional methacrylate, and 5 to 80 weight percent of an unsaturated acid functional monomer, wherein said macromonomer has a weight macromonomer having a weight average molecular weight of about 2,000 to 5,000 comprises about 20 to 80 percent by weight of polymerized methyl methacrylate. 10 to 50 percent by weight of polymerized methacrylic acid, and 10 to 40 percent by weight of 2-hydroxyethyl methacrylate and 0 to 20 percent of t-butylamino ethyl methacrylate.

Graft Copolymer Synthesis

The graft copolymer is prepared by emulsion polymerization wherein the macromonomer is first neutralized with a base and subsequently dispersed in water, and the backbone is formed in the presence of the macromonomer dispersion. This yields a graft copolymer emulsion without the necessity for emulsifiers. Typical bases are amines and include amino methyl propanol, amino ethyl propanol, dimethyl ethanol amine, triethyl amine and the like. A preferred base is dimethyl ethanol amine, and ammonium hydroxide. Other bases that can be used are metal hydroxides of sodium, potassium, lithium and the like. The backbone monomers can be a blend of monomers as described for the macromonomer.

Alkyl methacrylates can be used in the backbone of the graft copolymers, and typically have 1 to 18 carbon atoms in the alkyl group such as methyl methacrylate, ethyl methacrylate, propyl methacrylate, isopropyl methacrylate, butyl methacrylate, pentyl methacrylate, hexyl methacrylate, 2-ethyl hexyl methacrylate, lauryl methacrylate and the like. Cycloaliphahtic methacrylates also can be used such as trimethylcyclohexyl methacrylate, isobutylcyclohexyl methacrylate, isobornyl methacrylate and the like.

Aryl methacrylates such as benzyl methacrylate also can be used in the backbone of the graft copolymers. Other polymerizable monomers that can be used are styrene, alpha methyl styrene, methacrylamide and methacrylonitrile. Hydroxy-functional monomers can be used such as hydroxyethyl methacrylate. hydroxypropyl methacrylate, and the like. Amino-functional monomers can be used such as diethylaminoethyl methacrylate, t-butylamino methacrylate. methacryloxyethyl (2-2'-spirocyclohexyl) oxazolidine. 2-(4-pyridyl)ethyl methacrylate and the like.

Alkyl acrylates can be used preferably having 1 to 18 carbons in the alkyl group such as methyl acrylate, ethyl acrylate, propyl acrylate, isopropyl acrylate, butyl acrylate pentyl acrylate, hexyl acrylate 2-ethyl hexyl acrylate, nonyl acrylate, lauryl acrylate and the like. Functional monomers such as hydroxyalkyl acrylates, aminoalkyl acrylates, acrylamide and acrylonitrile can be used, including 2-hydroxyethyl acrylate, '- and 3-hydroxypropyl acrylate, 2- and 4-hydroxybutyl acrylate, n-butoxymethyl acrylamide, n-methoxymethyl methacrylamide, dimethylaminoethyl acrylate, n-methylol acrylamide etc. Other functional monomers also include the reaction product of acid functional monomers with monoepoxy ethers or monoepoxy esters and reaction products of glycidyl functional monomers with mono amines or mono acids. Cycloaliphatic acrylates can be used such as trimethylcyclohexyl acrylate, t-butylcyclohexyl acrylate and the like. Aryl acrylates such as benzyl acrylate also can be used. Vinylaromatics can be used as styrene, vinyl toluene, t-butyl styrene, α-methyl styrene and the like. Vinyl derivatives can be used as vinyl acetate, vinylpropionate, versatic esters of vinylalcohol (VEOVA-Shell) vinylchloride, vinylsilane and the like. Other polymerizable monomers include those mentioned under macromonomer compositions.

The backbone monomers preferably include a secondary amino functional monomer as t-butyl amino ethyl methacrylate. Secondary amino functionality can also be achieved by hydrolysis of methacryloxyethyl-(2,2'-spirocyclohexyl) oxazolidine in water to yield 2-hydroxyethyl amino ethyl methacrylate. Another way of getting secondary amino functionality can be added to a polymer chain according to the reaction shown in Formula 1, wherein copolymerized glycidylmethacrylate is reacted with a monofunctional amine.

Formula I

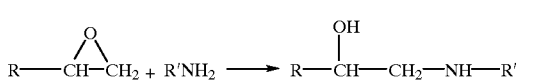

Acid functionality can also be converted to primary amine functionality by imination and further reaction with a monoepoxide would give a secondary amine, as shown in Formula 2.

Formula 2

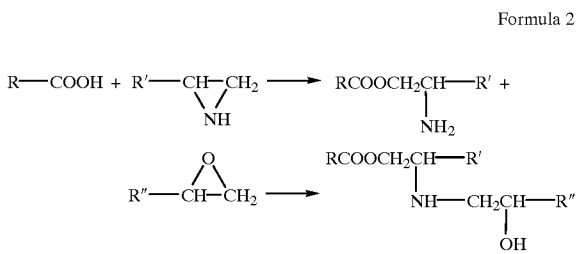

Typical cosolvents in blends with water coming from the macromonomer dispersion that can be used in the synthesis of the graft copolymer are ketones such as methyl ethyl ketone, isobutyl ketone, ethyl amyl ketone, acetone, alcohols such as methanol, ethanol, isopropanol, esters such as ethyl acetate, glycols such as ethylene glycol mono butyl ether and the like.

Polymerization initiators are used in the preparation of the graft copolymer. Some suitable thermal initiators are water miscible and include potassiumpersulfate, sodiumpersulfate, ammoniumpersulfate, and 4,4'-azobis (4-cyanovaleric acid). Other thermal initiators include azo compounds such as 2,2'-azobis(2-methylbutane nitrile) and 2,2'-azobis (2,4'-dimethylpentane nitrile) 2,2'-azobis(2,4-dimethyl-4-methoxyvalero nitrile). A preferred azo catalyst is 4,4'-azobis, 4-cyanovaleric acid. Other suitable thermal catalysts include peroxides and hydroperoxides such as di-tertiarybutyl peroxide, di-cumyl peroxide, di-tertiary amyl peroxide, cumene hydroperoxide, di(n-propyl peroxydicarbonate, peresters such as tertiary amyl peroxyacetate and the like.

Redox initiators can be used and include peroxides combined with suitable reducing agents, said reducing agents including ascorbic acid; sodium formaldehyde sulphoxylate; thiosulfates; bisulphates; hydrosulphates; water soluble amines such as diethylene triamine, etc.; and salts as the sulphates of metals which are capable of existing in more than one valence state, said metal including cobalt, cerium, iron, nickel, copper, and the like.

Chain transfer agents, such a mercaptans and halogenated derivatives, can be used to control the molecular weight of the copolymer. Other ways of controlling the molecular weight is the use of low molecular weight macromonomers. A preferred chain transfer agent is oligomeric methacrylate having a degree of polymerization from 2 to 10, wherein the oligomeric methacrylate is added in an amount to control the weight average molecular weight of the graft copolymer to about 10,000 to 80,000. The graft copolymerization process of this invention is typically carried out below 140° C. and preferably at 20° to 100° C. depending on the initiator. The graft copolymerization process can be either batch, semi-batch or continuous feed.

A preferred polymer backbone comprises 5 to 50 weight percent of a vinyl aromatic, 10 to 70 percent of alkyl acrylate, cycloalkyl acrylate, or mixtures thereof, 5 to 40 weight percent of hydroxy functional polymerizable acrylate, hydroxyfunctional polymerizable methacrylate, or mixtures thereof, and 1 to 8 weight percent of a secondary amino functional monomer.

Another more preferred backbone polymer for use in a two component coating formulation comprises 1 to 10 weight percent t-butylaminoethyl methacrylate, 5 to 40 weight percent of a vinyl aromatic, S to 40 weight percent of an alkyl or cycloalkyl acrylate, and 5 to 40 weight percent of a hydroxy functional monomer, preferably hydroxy isopropyl methacrylate.

Package A—Binder

In a two-package waterborne system, the aqueous emulsion graft copolymers comprise a single package, designated herein as package A. The emulsion graft copolymer can be used directly as binder or mixed with other auxiliary polymeric binders. The auxiliary binders can but need not have hydroxy and/or secondary amine functionality.

The aqueous or emulsion graft copolymer can also be used in a formulation which incorporates additional compounds such as auxiliary binders, pigments, extenders and additives. Preferably, the waterborne coating composition comprise 0 to 75 weight percent solids of auxiliary binders, additives, pigments and extenders. Examples of pigments are organic and inorganic pigments such as phthalocyanines, quinacridones, iron oxides, titanium dioxide, aluminum silicates, talcs and anticorrosion type pigments such as zinc phosphates and so forth. Examples of additives include but are not limited to defoamers, thickeners, leveling agents, dispersants, UV absorbers, antioxidants and the like.

The formulations containing the graft copolymer emulsion and auxiliary polymers and agents can be diluted further with water or cosolvent to bring it to a suitable viscosity. Typical solvents include alcohols, ethers, ketones, esters, aromatics, aliphatics. Acids or bases can be added to adjust the pH of the formulation.

Package B—Curing Agent

In a two-package waterborne system, the polyisocyanate curing agent comprises a single package, designated herein as package B. The curing agent can be any organic polyisocyanate or mixtures thereof which have aliphatically, cycloaliphatically, aryl-aliphatically, or aromatically bound isocyanate groups. The polyisocyanate curing agent will have at least two isocyanate functional (NCO) groups. If necessary, the polyisocyanates can be used together with small quantities of inert solvents to lower the viscosity.

Preferred polyisocyanates are those containing biuret, urethane, uretdione, and/or isocyanurate groups prepared from hexamethylene diisocyanate (HDI), isophorone diisocyanate, 1-isocyanto-3,3,5-trimethyl-5-isocyanato methylcyclohexane (IPDI), bis-(isocyanato cyclohexyl)-methane (HDPDI) and m-tetramethyl xylene diisocyanate (mTMXDI), for example N,N',N'-tri-(6-isocyanatohexyl)-biuret and/or N,N',N'-tri-(6-isocyanatohexyl)-isocyanurate; also, polyisocyanates prepared from 2,6-diisocyanatotoluene and 4,4'-diisocyanatodiphenylmethane or mixtures thereof. Polyisocyanates rendered hydrophilic with polyethylene oxide can be used as curing agents. Furthermore, hydrophobic polyisocyanates can be blended with the hydrophilic polyisocyanate up to a weight ratio of 75 parts hydrophobic polyisocyanate to 25 parts hydrophilic polyisocyanates. Suitable hydrophilic polyisocyanates include Desmodur® LS2032 from Bayer.

Package A Combined with Package B—Coating Compositions

Before application on a substrate, the coating composition of this invention is prepared by combining the emulsion graft copolymers in package A with a polyisocyanate curing agent contained in package B and stirring at room temperature. Emulsifiers can be added to assist dispersion and stabilization of the coating composition. The copolymers in package A contain both hydroxy (OH) functional and secondary amino (NH) functional groups, and the curing agent of package B contains isocyanate (NCO) functional groups. The quantity of polyisocyanate curing agent used is calculated to result in an isocyanate to hydroxy and secondary amino (NCO/(OH+NH)) equivalent ration of 0.5/1 to 5/1, preferably 0.8/1 to 2/1.

The coating compositions according to the invention are suitable for all fields of applications. Examples include coatings for concrete, wood, paper and metals. The coating compositions can also be used as primers or fillers or as binders for top coats in automotive paints. After reducing the coating composition to a suitable viscosity with water and/or cosolvents, the coating composition is applied on the substrate and dried at room temperature or under stoving conditions up to 220° C. The following Examples illustrate the present invention in more detail. All parts and percentages are expressed by weight. Molecular weights are determined using gel permeation chromatography.

EXAMPLES AND PROCEDURES

Procedures 1 to 10 Macromonomers

These procedures illustrate the use of CoII chelate in the synthesis of the following macromonomers. The chelate is $BF_2$ bridged CoII (1,2-diphenyl-1,2-dioxoiminoethane)2 $(H_2O)_2$ chelate. Mixture 1 of Table 1 below was heated at reflux (±80° C.) in a reaction vessel that was kept under nitrogen. Mixture 2 was added over 4 hours. Simultaneously with mixture 2, mixture 3 was added over 90 min followed immediately by mixture 4. Mixture 5 was added for rinsing, followed by a 5 min hold. Afterwards, mixture 6 was added over 30 min followed by another rinsing step and held for 60 min. During the total process, the temperature was kept at reflux.

TABLE 1

|  | Procedure 1 | Procedure 2 | Procedure 3 | Procedure 4 | Procedure 5 | Procedure 6 |
|---|---|---|---|---|---|---|
| Mixture 1 |  |  |  |  |  |  |
| Methyl ethyl ketone | 20 | 20 | 20 | 20 | 20 | 20 |
| Mixture 2 |  |  |  |  |  |  |
| Methyl Methacrylate | 30 | 26 | 45 |  |  |  |
| 2-Ethyl Hexyl Methacrylate |  |  |  | 26 | 30 | 37.5 |
| t-Butyl Amino Ethyl Methacrylate |  |  |  |  |  | 2.5 |
| 2-Hydroxy Ethyl Methacrylate |  | 14 |  | 14 |  | 5 |
| Methacrylic Acid | 20 | 10 | 5 | 10 | 20 | 5 |
| Methyl Ethyl Ketone | 6 | 6 | 6 | 6 | 6 | 6 |
| Mixture 3 |  |  |  |  |  |  |
| Methyl Ethyl Ketone | 4 | 4 | 9.33 | 4 | 4 | 4 |
| COII Chelate | 0.006 | 0.006 | 0.003 | 0.012 | 0.006 | 0.004 |

TABLE 1-continued

|  | Procedure 1 | Procedure 2 | Procedure 3 | Procedure 4 | Procedure 5 | Procedure 6 |
|---|---|---|---|---|---|---|
| VAZO ® 67 initiator Mixture 4 | 0.35 | 0.35 | 1 | 0.35 | 0.35 | 0.35 |
| Methyl Ethyl Ketone | 10 | 10 | 4.67 | 10 | 10 | 10 |
| COII Chelate | 0.003 | 0.003 | 0.0015 | 0.006 | 0.003 | 0.002 |
| VAZO ® 52 initiator Mixture 5 | 0.3 | 0.3 | 0.3 | 0.3 | 0.3 | 0.3 |
| Methyl Ethyl Ketone Mixture 6 | 1.23 | 1.23 | 1.6955 | 1.23 | 1.23 | 1.23 |
| Tignonox ® 25C75 |  | 0.1 |  |  |  |  |
| VAZO ® 52 initiator | 0.1 | 0.1 |  | 0.1 | 0.1 | 0.1 |
| Methyl Ethyl Ketone | 1.9 | 1.9 | 1.9 | 1.9 | 1.9 | 1.9 |
| Methyl Ethyl Ketone Final thinning | 1 | 1 | 1 | 1 | 1 | 1 |
| Methyl Ethyl Ketone | 5.111 | 5.111 | 4 | 5.102 | 5.111 | 5.114 |
| TOTAL | 100 | 100 | 100 | 100 | 100 | 100 |

VAZO ® 52  DuPont  2,2-Azo bis(2,4-dimethylpentanenitrile)
VAZO ® 67  DuPont  2,2-Azo bis(2-methylbutanenitrile)
Trigonox ® 25C75  Akzo  t-butylperoxypivalate  75% in mineral spirits

TABLE 2

|  | Procedure 1 | Procedure 2 | Procedure 3 | Procedure 4 | Procedure 5 | Procedure 6 |
|---|---|---|---|---|---|---|
| Test Results |  |  |  |  |  |  |
| Solids | 51.8% | 50.2% | 50.0% | 48.7% | not measured | 49.7% |
| Viscosity (Gardner Holdt) | Z3 | 1¼ | M | less than A | more than Z6 | Z4⅓ |
| Acid value | 252 | 143 | 68 | 133 | 250 | 65 |
| Molecular Weight Number | 2300 | 1500 | 3200 | 1700 | 2000 | 6900 |
| Molecular Weight Weight | 4800 | 3000 | 6400 | 3400 | 4100 | 15400 |

TABLE 3

|  | Procedure 7 | Procedure 8 | Procedure 9 | Procedure 10 |
|---|---|---|---|---|
| Mixture 1 |  |  |  |  |
| Methyl ethyl ketone | 20 | 20 | — | 20 |
| Isopropanol | — | — | 20 | — |
| Mixture 2 |  |  |  |  |
| Methyl Methacrylate | 22.5 | 18 | — | 27.5 |
| Isopropanol | — | — | 6.5 | — |

TABLE 3-continued

|  | Procedure 7 | Procedure 8 | Procedure 9 | Procedure 10 |
|---|---|---|---|---|
| t-Butyl Amino Ethyl Methacrylate | — | — | — | 2.5 |
| 2-Hydroxy Ethyl Methacrylate | 17.5 | 22 | 30 | 10 |
| Methacrylic Acid | 10 | 10 | 20 | 10 |
| Methyl Ethyl Ketone | 6 | 6 | — | 6 |
| Mixture 3 | | | | |
| Methyl Ethyl Ketone | 4 | 4 | 7.5 | 4 |
| COII Chelate | 0.006 | 0.006 | 0.0075 | 0.010 |
| VAZO ® 67 Initiator | 0.35 | 0.35 | — | 0.35 |
| VAZO ® 52 Initiator | — | — | 0.1875 | — |
| Mixture 4 | 10 | 10 | 12.5 | 10 |
| Methyl Ethyl Ketone | | | | |
| COII Chelate | 0.003 | 0.003 | 0.0125 | 0.005 |
| VAZO ® 52 Initiator | 0.3 | 0.3 | 0.3125 | 0.3 |
| Mixture 5 | | | | |
| Methyl Ethyl Ketone | 1.23 | 1.23 | 1 | 1.23 |
| Isopropanol | — | — | 1 | — |
| Mixture 6 | | | | |
| Trigonox ® 25C75 | — | — | — | 0.1 |
| VAZO ® 52 Initiator | 0.1 | 0.1 | 0.1 | — |
| Methyl Ethyl Ketone | 1.9 | 1.9 | 1.9 | 1.9 |
| Methyl Ethyl Ketone | 1 | 1 | 1 | — |
| Final thinning | | | | |
| Methyl Ethyl Ketone | 5.11 | 5.11 | 1.5 | 0.1 |
| Isopropanol | — | — | 7.48 | 6.11 |
| TOTAL | 100 | 100 | 111 | 100 |

TABLE 4

|  | Procedure 7 | Procedure 8 | Procedure 9 | Procedure 10 |
|---|---|---|---|---|
| Test Results | | | | |
| Solids | 49.9% | 48.4% | 45% | 46.9% |
| Viscosity (Gardner Holdt) | K | K | X + ½ | >>Z6 |
| Acid value | 141 | 125 | 231 | 138 |
| Molecular Weight Number | 1800 | 1900 | 1800 | 1500 |
| Molecular Weight Weight | 3300 | 3300 | 3500 | 6300 |

Procedures 11 and 12. Oligomeric Methacrylates

TABLE 5

Mixture 1 was brought to reflux under nitrogen inserting. Mixture 2 was added as a shot followed by addition of mixture 3 over 4 hours.

|  | Procedure 11 | Procedure 12 |
|---|---|---|
| Mixture 1 | | |
| 2-Ethyl Hexyl Methacrylate | — | 14 |
| Methyl Ethyl Ketone | 6 | 6 |
| Methyl Methacrylate | 14 | — |
| Mixture 2 | | |
| COII Chelate | 0.01 | 0.02 |
| Methyl Ethyl Ketone | 2.5 | 2.5 |
| Methyl Ethyl Ketone (Rinse) | 1 | 1 |
| Mixture 3 | | |
| 2-Ethyl Hexyl Methacrylate | — | 56 |
| Methyl Methacrylate | 56 | — |
| Methyl Ethyl Ketone | 18.93 | 18.92 |
| VAZO ® 52 | 0.56 | 0.56 |
| Final thinning | | |
| Methyl Ethyl Ketone | 1 | 1 |
| TOTAL | 100 | 100 |
| Test Result | | |
| Viscosity (Gardner Holdt) | less than A | less than A |
| MN | 230 | 610 |
| MW | 330 (three peaks) | 800 (three peaks) |

Examples 1 to 12. Graft Copolymer Emulsions

These Examples illustrate the preparation of a graft copolymer emulsion according this invention.

Mixture 1 was heated to reflux (±95° C.) after the pH has been adjusted to 7.5–8. The solvent methyl ethyl ketone and/or isopropanol was stripped-off azeotropically. Mixture 2 and 3 were further added simultaneously over 4 hours. Mixture 4 was added as a rinse and the reactor contents were further held at reflux for 1 hour. Mixture 5 was added and the solvent (methyl ethyl ketone and/or isopropanol) was further distilled azeotropically. Finally, the pH was adjusted to about 8.

TABLE 6

|  | Example 1 | Example 2 | Example 3 | Example 4 | Example 5 | Example 6 |
|---|---|---|---|---|---|---|
| Mixture 1 | | | | | | |
| Deionized water | 26.79 | 26.79 | 27.99 | 26.74 | 26 | 26 |
| Macromonomer Procedure 1 | — | — | — | 11.25 | — | — |
| Macromonomer Procedure 2 | 22.50 | 22.50 | 22.50 | — | — | — |
| Macromonomer Procedure 4 | — | — | — | — | 22.50 | 22.50 |
| Dimethylethanolamine | 2.1 | — | 2.1 | 2.1 | — | — |
| Dimethylaminomethylpropanol (80% in water) | — | 3.3 | — | — | 3.3 | 3.3 |
| Mixture 2 | | | | | | |
| Styrene | 13.5 | 13.5 | 13.5 | 13.5 | 13.5 | 13.5 |
| 2-Ethylhexyl Acrylate | 8.10 | 8.10 | 8.10 | 13.725 | — | — |
| 2-Hydroxypropyl Methacrylate | 7.65 | 7.65 | 7.65 | 7.65 | — | — |
| Adduct Acrylic Acid and Cardura ® E10* | — | — | — | — | 15 | 15 |
| t-Butylamino- | — | 2.25 | 2.25 | 2.25 | 2.25 | 2.25 |

TABLE 6-continued

|  | Example 1 | Example 2 | Example 3 | Example 4 | Example 5 | Example 6 |
|---|---|---|---|---|---|---|
| ethyl Methacrylate |  |  |  |  |  |  |
| Butyl Cellosolve | 0.50 | 0.50 | 0.50 | 0.50 | 0.50 | 0.50 |
| Oligomer of Procedure II | 3.21 | 3.21 | 3.21 | 3.21 | 6.43 | 6.43 |
| Methacryloxy-ethyl (2,2'-Spirocylco Mixture 3 | 2.25 | — | — | — | — | — |
| Ammoniumpersulfate | — | — | — | — | 0.64 | — |
| Azo-Carboxy** | 0.8 | 0.8 | 0.8 | 0.8 | — | 0.8 |
| Dimethyl-ethanolamine | 0.6 | — | 0.6 | 0.6 | — | — |
| Dimethyl-aminoethyl-propanol (80% in water) | — | 0.8 | — | — | — | 0.8 |
| Deionized water | 18.6 | 18.4 | 18.6 | 18.6 | 19.36 | 18.4 |
| Mixture 4 |  |  |  |  |  |  |
| Deionized Water | 0.5 | 0.5 | 0.5 | 0.5 | 0.5 | 0.5 |
| Butylcellosolve | 0.5 | 0.5 | 0.5 | 0.5 | 0.5 | 0.5 |
| Mixture 5 |  |  |  |  |  |  |
| Deionized water | 2.45 | 2.45 | 2.45 | 3.90 | 2.45 | 2.45 |
| TOTAL | 112.213 | 112.213 | 112.213 | 105.625 | 112.93 | 112.93 |
| LOSS | 12.213 | 12.213 | 12.213 | 6.588 | 12.93 | 12.93 |
| YIELD | 100 | 100 | 100 | 99.037 | 100 | 100 |

*The reaction product of acrylic acid and Cardura ® E10 (Shell, epoxyester of a $C_{10}$ branched fatty acid mixture) prepared at 90% in isopropanol.
**4,4'azobis(4-cyanovaleric acid)

TABLE 7

|  | Example 1 | Example 2 | Example 3 | Example 4 | Example 5 | Example 6 |
|---|---|---|---|---|---|---|
| Test results |  |  |  |  |  |  |
| Solids | 45.3% | 47.3% | 45.3% | 44.27% | 40.1% | 42.7% |
| Viscosity (Brookfield) | 400 cps | 14,800 cps | 360 cps | 720 cps | 45 cps | 520 cps |
| pH | 7.9 | 8.2 | 8.3 | 8.3 | 7.3 | 8.2 |
| MN | 5900 | 5600 | 5700 | 8800 | 3000 | 2900 |
| MW | 31,200 | 36,400 | 39,300 | 55,700 | 14,500 | 18,300 |

TABLE 8

|  | Example 7 | Example 8 | Example 9 | Example 10 | Example 11 | Example 12 |
|---|---|---|---|---|---|---|
| Mixture 1 |  |  |  |  |  |  |
| Deionized Water | 28 | 28 | 28 | 28 | 28 | 28 |
| Macromonomer Procedure 1 | 11.25 | — | — | — | — | — |
| Dimethyl-ethanolamine | 2.1 | 2.1 | 2.1 | 2.1 | 2.1 | 1.68 |
| Macromonomer Procedure 7 | — | 22.5 | — | — | — | — |

TABLE 8-continued

|  | Example 7 | Example 8 | Example 9 | Example 10 | Example 11 | Example 12 |
|---|---|---|---|---|---|---|
| Macromonomer Procedure 8 | — | — | — | 22.5 | — | — |
| Macromonomer Procedure 9 | — | — | — | — | — | 10 |
| Macromonomer Procedure 10 Mixture 2 | — | — | 22.5 | — | 22.5 | — |
| Styrene | 13.5 | 13.5 | 13.5 | 13.5 | 13.5 | 13.5 |
| 2-Ethylhexyl Acrylate | 9.225 | 9 | 10.35 | 9 | 8.66 | 9 |
| 2-Hydroxypropyl Methacrylate | 11.025 | 6.75 | 7.65 | 5.625 | 7.65 | 7.65 |
| t-Butylamino-ethyl Methacrylate | 3.375 | 2.25 | — | 3.375 | 1.69 | 2.25 |
| Butyl Cellosolve | 0.5 | 0.5 | 0.5 | 0.5 | 0.5 | 0.5 |
| Oligomer of Procedure 11 | 3.21 | 3.21 | 3.21 | 3.21 | 3.21 | 3.21 |
| Methyl Methacrylate Mixture 3 | — | — | — | — | — | 5.85 |
| Azo-Carboxy (See Table 7) | 0.8 | 0.8 | 0.8 | 0.8 | 0.8 | 0.8 |
| Dimethyl-ethanol amine | 0.6 | 0.6 | 0.6 | 0.6 | 0.6 | 0.6 |
| Deionized Water Mixture 4 | 18.6 | 18.6 | 16.39 | 18.6 | 16.39 | 18.6 |
| Deionized Water | 0.5 | 0.5 | 0.5 | 0.5 | 0.5 | 0.5 |
| Butyl-cellosolve Mixture 5 | 0.5 | 0.5 | 0.5 | 0.5 | 0.5 | 0.5 |
| Deionized Water | 3.403 | 3.403 | 29.57 | 3.403 | 29.57 | 3.823 |
| TOTAL | 106.588 | 112.213 | 136.17 | 112.213 | 136.17 | 106.463 |
| LOSS | 6.588 | 12.213 | 12.21 | 12.213 | 12.21 | 6.463 |
| YIELD | 100 | 100 | 123.96 | 100 | 123.96 | 100 |

TABLE 9

|  | Example 7 | Example 8 | Example 9 | Example 10 | Example 11 | Example 12 |
|---|---|---|---|---|---|---|
| Test results |  |  |  |  |  |  |
| Solids | 49% | 44.8% | 36.2% | 44.9% | 34.9% | 43.5% |
| Viscosity (Brookfield) | 75,000 cps | 560 cps | 88,000 cps | 1400 cps | 116,000 cps | 120 cps |
| pH | 8.2 | 8.3 | 7.9 | 8.4 | 8.4 | 8.5 |
| MN | 5900 | 2800 | 5800 | 2200 | 2500 | 4700 |
| MW | 26,600 | 14,300 | 47,300 | 11,700 | 25,800 | 20,600 |

TABLE 10

|  | Example 13 | Example 14 | Example 15 | Example 16 | Example 17 |
|---|---|---|---|---|---|
| Macromonomer of Procedure 2 | 15 | 25 | 25 | — | — |

TABLE 10-continued

|  | Example 13 | Example 14 | Example 15 | Example 16 | Example 17 |
|---|---|---|---|---|---|
| Macromonomer of Procedure 4 | — | — | — | — | 25 |
| Macromonomer of Procedure 1 | — | — | — | 12.5 | — |
| Oligomer of Procedure 9 | 5 | 5 | 5 | 5 | 5 |
| Styrene | 30 | 40 | 15 | 30 | 30 |
| 2-Ethyl Hexyl Acrylate | 23 | 8 | 33 | 25 | 25.5 |
| 2-Hydroxypropyl-methacrylate | 22 | 17 | 17 | 10 | 24.5 |
| t-Butylaminoethyl-methacrylate | 5 | 5 | 5 | 5 | 2.5 |
| Total | 100 | 100 | 100 | 100 | 100 |
| Test result |  |  |  |  |  |
| Solids | 45.7 | 48.5 | 45.3 | 48.5 | 45.5 |
| Viscosity | 3350 cps | 800 cps | 350 cps | 400 cps | 4600 cps |
| pH | 8.3 | 8 | 8.1 | 9.2 | 8 |
| MN | 8100 | 7500 | 4600 | 5100 | 7700 |
| MW | 49,200 | 65,000 | 21,400 | 25,500 | 37,800 |

Examples 18 and 19

The acrylic emulsions were blended with a water-dispersible polyisocyanate (Desmodur® 2032) in such a ratio that the ratio of NCO over OH-functional groups was 1.5 over 1. Drawdowns were prepared over glass and the panels were air-dried (AD) and infrared dried (IR). Dry-film builds are indicated in microns ($\mu$). The Persoz hardness after AD and solvent-resistance both AD and IR were measured after several hours (H) to days (D).

TABLE 11

| | Persoz Hardness (AD) | | | | | | | | | | | | | |
|---|---|---|---|---|---|---|---|---|---|---|---|---|---|---|
| | Without Polyisocyanate | | With Polyisocyanate | | | | | | | | | | | |
| | 2H | 4H | 4H | | 1D | | 4D | | 9D | | Solvent Resistance | | | |
| Based On | 50$\mu$ | 50$\mu$ | 30$\mu$ | 55$\mu$ | 30$\mu$ | 55$\mu$ | 30$\mu$ | 55$\mu$ | 30$\mu$ | 55$\mu$ | 1D | 4D | 8D | 1R |
| Ex. 18 Emulsion of Example 3 | 103 | 113 | 170 | 162 | 257 | 234 | 304 | 273 | 267 | 287 | P-F | VG-EX | G | EX |
| Ex. 19 Emulsion of Example 2 | 114 | 128 | 207 | 176 | 273 | 173 | 317 | 204 | 303 | 188 | P-F | VG-EX | F-G | G |

What is claimed is:

1. A polyisocyanate curable graft copolymer emulsion having a weight average molecular weight of 3,000 to 65,000 which is anionically stabilized and which comprises:
   i) 20 to 95 weight percent of a polymer backbone of polymerized unsaturated compounds;
   ii) 5 to 80 weight percent of a macromonomer comprising at least about 5 weight percent of an unsaturated acid-functional monomer, said macromonomer prepared using a cobalt-based catalytic chain transfer agent and said macromonomer having a weight average molecular weight of about 1,000 to 30,000;
in which the backbone comprises 0.5 to 30 weight percent, of total polymerizable unsaturated compounds, of an amino-functional polymerizable component.

2. A two-package waterborne coating composition comprising as binder components:
   a) 20 to 95 weight percent solids of a polyisocyanate curable graft copolymer emulsion according to claim 1;
   b) 5 to 80 weight percent solids of a polyisocyanate curing agent; and
   c) 0 to 75 weight percent of other film-forming polymers.

3. The waterborne coating composition of claim 2 wherein said secondary amino functional monomer is t-butylaminoethyl methacrylate.

4. The waterborne coating composition of claim 2 wherein said catalytic chain transfer agent is selected from the group consisting of borodifluoro-stabilized chelates of a dialkyl- or diaryl-glyoxime of CoII or CoIII.

5. The waterborne coating composition of claim 2 wherein said graft copolymer comprises 60 to 95 weight percent of polymer backbone and 5 to 40 weight percent of macromonomer wherein:
   the polymer backbone comprises 5 to 50 weight percent of a vinyl aromatic, 10 to 70 weight percent of a compound selected from the group consisting of alkyl acrylate, cycloalkyl acrylate, and mixtures thereof, 5 to 40 weight percent of a compound selected from the group consisting of a hydroxy-functional polymerizable acrylate, hydroxy-functional polymerizable methacrylate, and mixtures thereof and 1 to 8 weight percent of a secondary amino-functional monomer; and
   the macromonomer comprises 10 to 90 weight percent of a compound selected from the group consisting of alkyl methacrylate, cycloalkyl methacrylate, and mixtures thereof, 0 to 40 weight percent of a hydroxy-functional methacrylate, 0 to 20 weight percent of a secondary amino functional methacrylate, and 5 to 80 weight percent of an unsaturated acid-functional monomer, wherein said macromonomer has a weight average molecular weight of 1,500 to 10,000.

6. The waterborne coating composition of claim 2 wherein said polyisocyanate curing agent is selected from the group consisting of derivatives of hexamethylene diisocyanate, derivatives if isophorone diisocyanate, derivatives of m-xylylene diisocyanate and mixtures thereof, the composition further comprising an oligomeric methacrylate having a degree of polymerization of 2 to 10, wherein said oligomeric methacrylate is added in an amount to control the weight average molecular weight of the graft copolymer to about 3,000 to 65,000.

7. The waterborne composition of claim 2 wherein said unsaturated acid-functional monomer is methacrylic acid and the graft copolymer is neutralized with an amine.

8. The waterborne coating composition of claim 2 further comprising 0 to 75 weight percent solids of a compound selected from the group consisting of auxiliary binder and crosslinker, additives, pigments, and extenders; and 0 to 75 weight percent of a hydrophobic polyisocyanate; and 25 to 100 weight percent of a hydrophilic polyisocyanate.

* * * * *